(12) United States Patent
Yousefi et al.

(10) Patent No.: US 8,804,755 B2
(45) Date of Patent: Aug. 12, 2014

(54) POWER DISSIPATION MANAGEMENT FOR WIRED TRANSCEIVERS

(71) Applicant: Broadcom Corporation, Irvine, CA (US)

(72) Inventors: Nariman Yousefi, Monarch Beach, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 12 days.

(21) Appl. No.: 13/960,731

(22) Filed: Aug. 6, 2013

(65) Prior Publication Data

US 2013/0322555 A1 Dec. 5, 2013

Related U.S. Application Data

(63) Continuation of application No. 12/944,355, filed on Nov. 11, 2010, now Pat. No. 8,520,553, which is a continuation of application No. 11/589,926, filed on Oct. 31, 2006, now Pat. No. 7,856,028.

(60) Provisional application No. 60/737,469, filed on Nov. 17, 2005.

(51) Int. Cl.
*H04L 12/28* (2006.01)
*H04L 12/12* (2006.01)

(52) U.S. Cl.
CPC ............... *H04L 12/12* (2013.01); *Y02B 60/32* (2013.01); *Y02B 60/35* (2013.01); *Y02B 60/34* (2013.01)
USPC ........................................... 370/419; 455/574

(58) Field of Classification Search
USPC ........................................................ 370/255
See application file for complete search history.

(56) References Cited

U.S. PATENT DOCUMENTS

| | | | | |
|---|---|---|---|---|
| 5,768,312 A | * | 6/1998 | Imamura | 375/228 |
| 2001/0055331 A1 | * | 12/2001 | Agazzi et al. | 375/216 |
| 2003/0023920 A1 | * | 1/2003 | Jeong et al. | 714/755 |
| 2004/0015765 A1 | * | 1/2004 | Cooper et al. | 714/750 |
| 2004/0233324 A1 | * | 11/2004 | Galambos et al. | 348/372 |
| 2005/0262364 A1 | * | 11/2005 | Diab et al. | 713/300 |
| 2006/0188043 A1 | * | 8/2006 | Zerbe et al. | 375/346 |

* cited by examiner

*Primary Examiner* — Sai-Ming Chan
(74) *Attorney, Agent, or Firm* — Sterne, Kessler, Goldstein & Fox P.L.L.C.

(57) ABSTRACT

A system, method and apparatus for reducing a power consumed by a physical layer device (PHY). A length of a cable connecting the PHY to a link partner is determined. Based on the length, power provided to one or more components of the PHY, or any portion thereof, is reduced. The power provided is reduced while maintaining a level of reliability specified by a protocol governing operation of the PHY. The length can be determined using time-domain reflectometry (TDR) techniques. Any portion of an echo cancellation filter, a crosstalk filter, an equalizer, a precoder, an analog-to-digital converter (ADC), a digital-to-analog converter (DAC), a forward error correction (FEC) decoder and/or an FEC coder can be powered-down or power-optimized to reduce the overall power consumed by the PHY. The protocol governing operation of the PHY can be IEEE 802.3.

20 Claims, 9 Drawing Sheets

US 8,804,755 B2

POWER DISSIPATION MANAGEMENT FOR WIRED TRANSCEIVERS

CROSS REFERENCE TO RELATED APPLICATIONS

This application is a continuation U.S. patent application Ser. No. 12/944,355, filed Nov. 11, 2010, which is a continuation of U.S. patent application Ser. No. 11/589,926, filed Oct. 31, 2006, which claims the benefit of U.S. Provisional Application No. 60/737,469, filed Nov. 17, 2005, all of which are incorporated herein by reference in their entirety.

BACKGROUND OF THE INVENTION

1. Field of the Invention

The present invention generally relates to the power management of physical layer devices (PHYs). More specifically, the present invention provides the reliable operation of a PHY at a reduced power level.

2. Background Art

Various standards exist which define signaling characteristics and performance requirements to insure interoperability between PHYs from different vendors. PHYs are designed to fully comply with all aspects of a standard to be considered "standard compliant." For example, IEEE 802.3 specifies that a 10 Gbps PHY must be capable of reliable operation over 100 meters of cable.

A primary market for 10 Gbps PHYs is in data center applications where the majority of cables are often less than 45 meters. PHY complexity and power dissipation are directly proportional to the maximum length of cable it must drive. To be standard compliant, the complexity and power necessary for 100 m operation is required even if the PHY is connected to cables significantly shorter than 100 m. This requirement causes a PHY to consume more power than necessary to provide reliable communication and operation over cable lengths that are less than 100 m. Further, multiple instances of a 10 Gbps 100 m-capable PHY can exceed the power budget of many applications due to this requirement.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

Transceivers (e.g., PHYs) are used to transmit and receive data over point-to-point copper wire connections (i.e., cables). Various standards or protocols define signaling characteristics and performance requirements to insure the interoperability between PHYs manufactured by different vendors. PHYs are designed to fully comply with all aspects of a given standard to be considered "standard compliant." For example, IEEE 802.3 specifies that a 10 Mbps, 100 Mbps, 1000 Mbps, or 10 Gbps PHY must be capable of reliable operation over 100 meters of cable. Such a requirement dictates PHY complexity and power dissipation. Accordingly, PHY complexity and power dissipation are directly proportional to the maximum length of cable that a PHY must drive.

To be considered standard compliant, the complexity and power necessary for 100 m operation is required even if a given PHY is connected to a link partner over a cable that is significantly shorter than 100 m. This inflexible constraint can be acceptable for 10 Mbps, 100 Mbps, and 1000 Mbps PHYs where the power needed for 100 m operation is low enough to permit multiple PHYs on a single line card (or within a single integrated circuit or chip). However, the power required for 10 Gbps operation over 100 m is quite large. Consequently, multiple instances of a 10 Gbps 100 m-capable PHY can exceed the power budget of many applications.

A primary market for 10 Gbps PHYs is in data center applications. Studies indicate that roughly 95% of cables in a data center are less than 45 meters. Accordingly, techniques are desired to permit PHYs to operate at reduced power levels for shorter cable lengths yet maintain compliance to the 100 m standard and/or maintain a target bit error rate (BER) and/or maintain a specified level of reliability.

Figure 1:
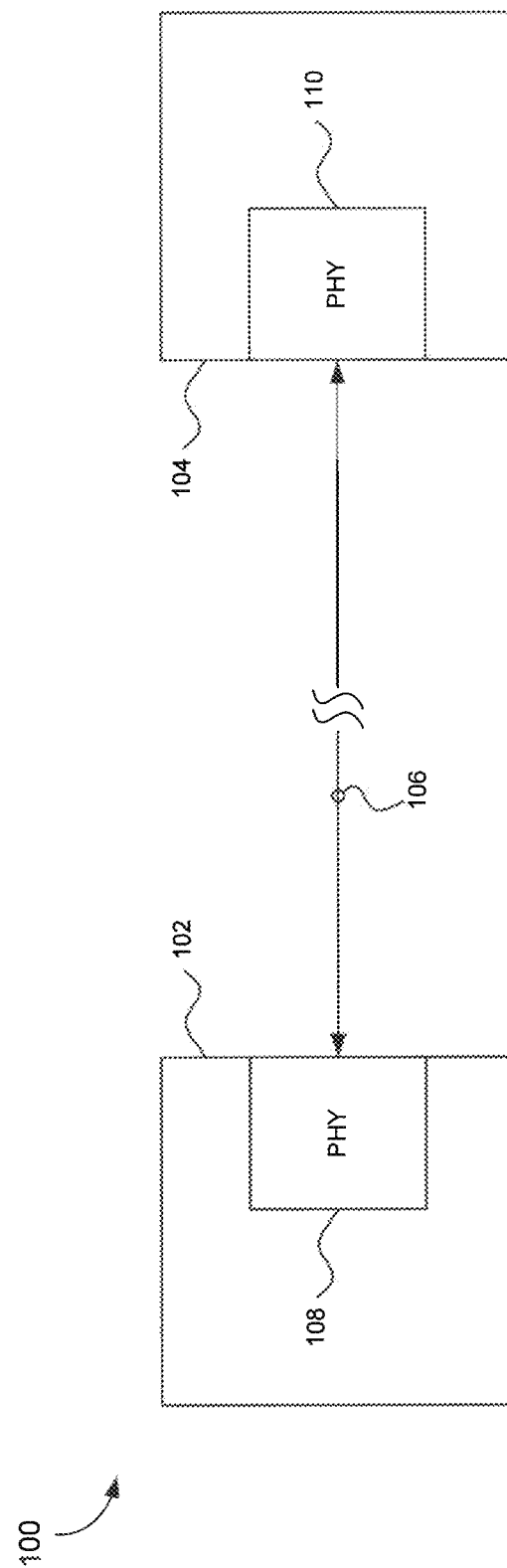
FIG. 1 illustrates a point-to-point communication system including a transceiver of the present invention.

FIG. 1 illustrates a point-to-point communication system 100, according to the present invention. The point-to-point communication system 100 includes a transceiver 102 of the present invention and a transceiver 104. Transceiver 102 and a transceiver 104 communicate over a cable 106. Cable 106 provides a point-to-point communication link between a PHY 108 of transceiver 102 and a PHY 110 of transceiver 104. Accordingly, transceiver 102 and transceiver 104 are considered link partners.

PHYs 108 and 110 can be 10 Mbps, 100 Mbps, 1000 Mbps, or 10 Gbps PHYs. To be compliant with IEEE 802.3, PHYs 108 and 110 must be capable of providing a minimal BER and/or level of reliable operation over a 100 m cable. Transceiver 102 (i.e., PHY 108) of the present invention can power down and/or reduce a level of power provided to certain portions of PHY 108 so as to operate in a power optimized mode. Transceiver 102 can operate in a power optimized mode when connected to a link partner over a cable that is less than 100 m while maintaining reliable communications in compliance to the 100 m standard. Overall, the power dissipated by transceiver 102 is reduced based on the length of the cable 106 driven by PHY 108 in a way that reliable communication is preserved or maintained. The same is true for PHY 110.

Transceiver 102 can automatically determine the length of cable 106 based on, for example, time-domain reflectometry (TDR) or techniques described in related application Ser. No. 10/282,206, filed Oct. 29, 2002, entitled "Channel Diagnostic Systems and Methods," herein incorporated by reference in its entirety. In some applications, the length of cable 106 may be known in advance. If the length of cable 106 is less than 100 m, PHY 108 can be configured (automatically or manually) to operate with only the power necessary to achieve reliable operation over the reduced cable length. The power optimizations can be implemented such that PHY 108 maintains interoperability with fully compliant link partners (i.e., the transceiver 104/PHY 110). That is, a signal transmitted by PHY 108 is compliant to the standard governing operation of PHY 108. Further, a receiver of PHY 108 can reliably recover data transmitted from a compliant link partner.

One or more portions of PHY 108 or transceiver 102 can be powered down or operated in a power saving mode when PHY 108 determines that the length of the cable is less than 100 m. Further, one or more operations implemented by PHY 108 or transceiver 102 can be limited, abbreviated, reduced or not conducted. Examples of possible actions while PHY 108 or transceiver 202 is in power saving mode includes, but are not limited to, the adjustment of the following constituent components or operations implemented by PHY 108 or transceiver 102.

- Powering down taps in echo and crosstalk cancellation filters such as, for example, near-end crosstalk (NEXT) and far-end cross talk (FEXT) filters;
- Powering down crosstalk cancellation filters with small coefficients;
- Powering down taps in an equalizer and/or a precoder;
- Bypassing additional equalization blocks, such as, for example a residual decision-feedback equalizer (DFE) and/or a noise predictor;
- Reducing datapath wordlength;
- Reducing resolution of an analog-to-digital converter (ADC);
- Reducing resolution of a digital-to-analog converter (DAC);
- Reducing linearity requirements on the ADC, DAC, and/or any amplifiers;
- Reducing forward error correction (FEC) coding gain by, for example, using hard decision decoding, reduced iterations, and/or bypassing outer (or inner) coding.

Each of the components involved in the power saving mode above is herein referred to, collectively, as power saving components.

As shown in FIG. 1, transceiver 202 includes a plurality of PHYs 108. Each of the PHYs may operate independently of each other. Alternatively, one or more PHYs may be configured to function cooperatively. During operation, any number of PHYs may be in power saving mode or normal power mode. For example, all PHYs of transceiver 202 can be in power saving mode. Alternatively, half of the PHYs of transceiver 202 can be in power saving mode while the other half can be in normal power mode.

Figure 2A:
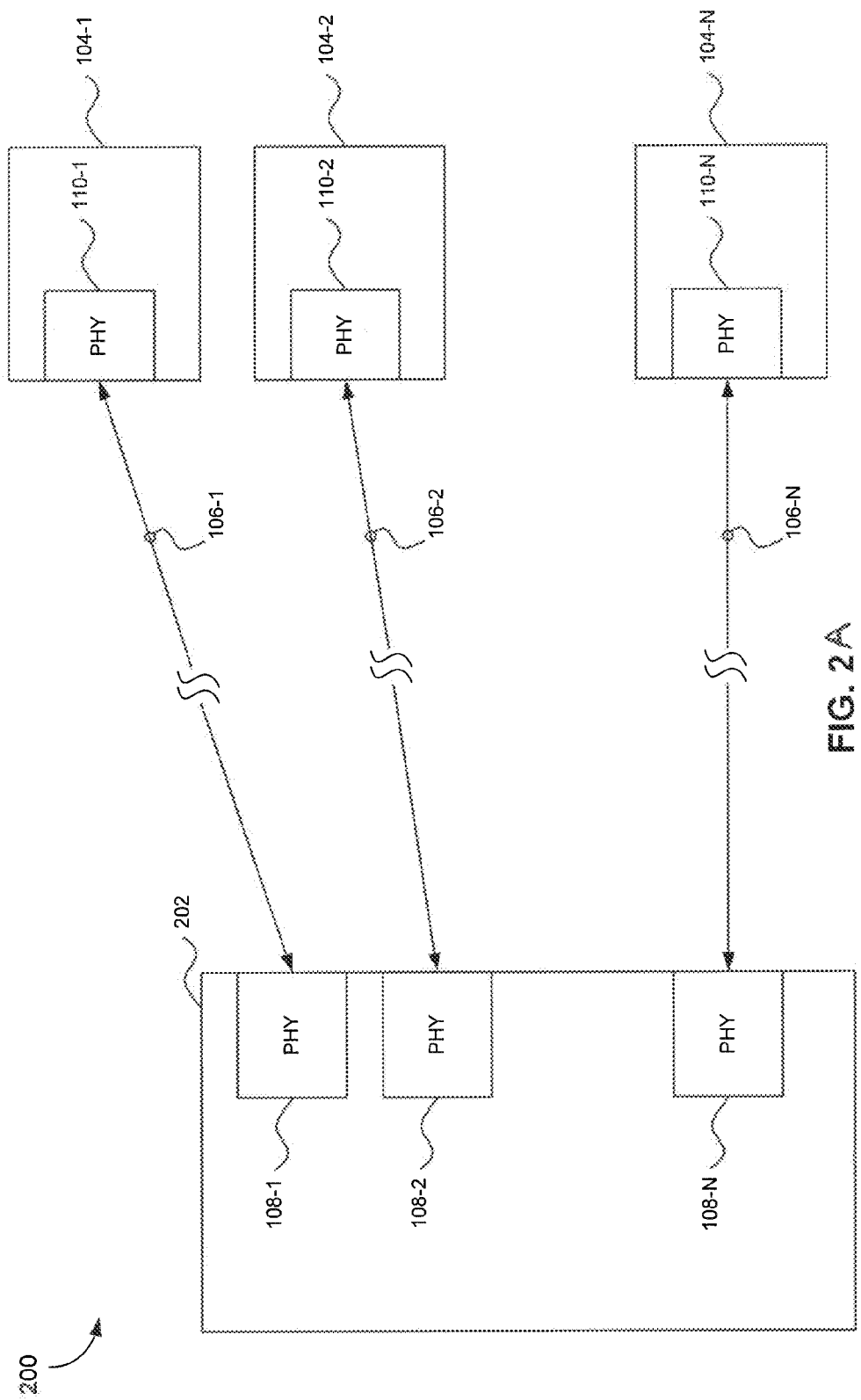
FIG. 2A illustrates a multiple physical layer device (PHY) communication system including a multiple PHY transceiver of the present invention.

FIG. 2A illustrates a multiple PHY communication system 200. The multiple PHY communication system 200 includes a transceiver 202 of the present invention coupled to a number of transceivers 104-1 through 104-N over associated cables 106-1 through 106-N. The transceiver 202 is a multiple PHY transceiver 202 comprising PHYs 108-1 through 108-N. The overall power consumed by the transceiver 202 is equal to the sum of the power consumed by the PHYs 108-1 through 108-N. According to an aspect of the present invention, the power dissipation of each PHY 108-1 through 108-N can be made dependent upon the length of the associated cable 106-1 through 106-N without comprising a specified level of reliable operation. As a result, the overall power consumed by the transceiver 202 is significantly reduced compared to requiring each PHY 108-1 through 108-N to be powered so as to support 100 m cable operation at all times.

Further, according to an aspect of the present invention, the transceiver 202 can be operated to support a specified power budget across the PHYs 108-1 through 108-N. For example, the transceiver 202 can be operated to enable a first subset of the PHYs 108-1 through 108-N to support long cables and the remaining PHYs 108-1 through 108-N to support shorter cables such that an overall power budget is maintained. The transceiver 202 can be configured manually or automatically, based on cable lengths reported by each PHY 108-1 through 108-N. In cases where some of the PHYs 108-1 through 108-N have yet been connected to cables, the transceiver 202 could automatically determine the maximum cable length allowed for any remaining unconnected PHYs.

As discussed above, statistics show that the majority of cables in a data center have lengths much less than 100 m. Accordingly, significant power reduction can be achieved over shorter cables. Power managed PHYs, as provided by an aspect of the present invention, can enable communication systems or multiple-PHY transceivers to exploit the statistical distribution of cable lengths to reduce overall power. The present invention allows the power budget of a multiple-PHY transceiver to be divided across the constituent PHYs as needed rather than assuming the worst case power level needed for each individual PHY. Power managed PHYs of the present invention enable the implementation of multiple 10 Gbps PHY applications/transceivers which would otherwise require too much power to be practical. Power managed PHYs of the present invention maintain complete interoperability with fully compliant PHYs.

Additionally, many existing 10 Gbps fiber ports have strict power limitations expected to be exceeded by 10 Gbps copper PHYs. In such applications where the cable length is less than 100 m, a power managed 10Gbps copper PHY of the present invention could enable the more expensive fiber modules to be replaced by less expensive copper PHYs.

Figure 2B:
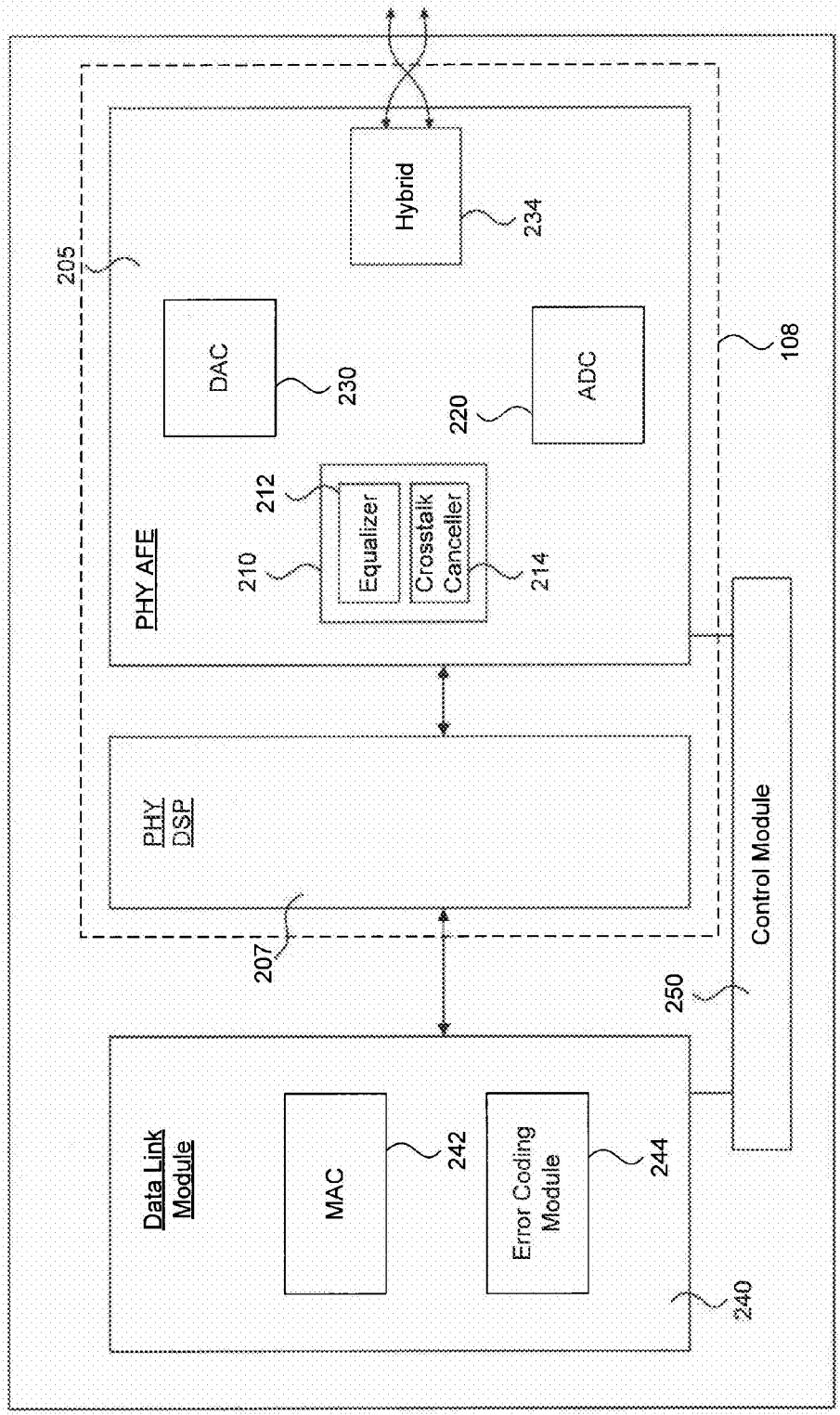
FIGS. 2B-2D illustrate exemplary block diagrams of transceivers according to embodiments of the present invention.

FIG. 2B illustrates a block diagram of transceiver 202 according to an embodiment of the present invention. Transceiver 202 includes one or more PHYs, such as PHY 108, a data link module 240, and a control module 250. PHY 108 includes an analog front end (AFE) 205 and a digital signal processing (DSP) module 207. PHY AFE 205 includes a signal processing module 210, an analog-to-digital convert (ADC) 220, a digital-to-analog converter (DAC) 230, and a hybrid circuit 234. Signal processing module 210 includes at least one equalizer 212 and at least one crosstalk canceller 214. Hybrid circuit 234 is a conventional circuit used to transform a twisted-pair cable connection system into dedicated transmit and receive lines.

Data link module 240 includes a media access controller (MAC) 242 and an error coding module 244 that is used to implement error coding on transmit signals and error correction on received signals.

Control module 250 is connected to each of the power saving components. Control module 250 may be implemented in software, hardware, or a combination of both. Control module 250 controls the settings of each of the power saving components (e.g. equalizer 212, canceller 214, ADC 220, DAC 230, and module 244).

Figure 2C:
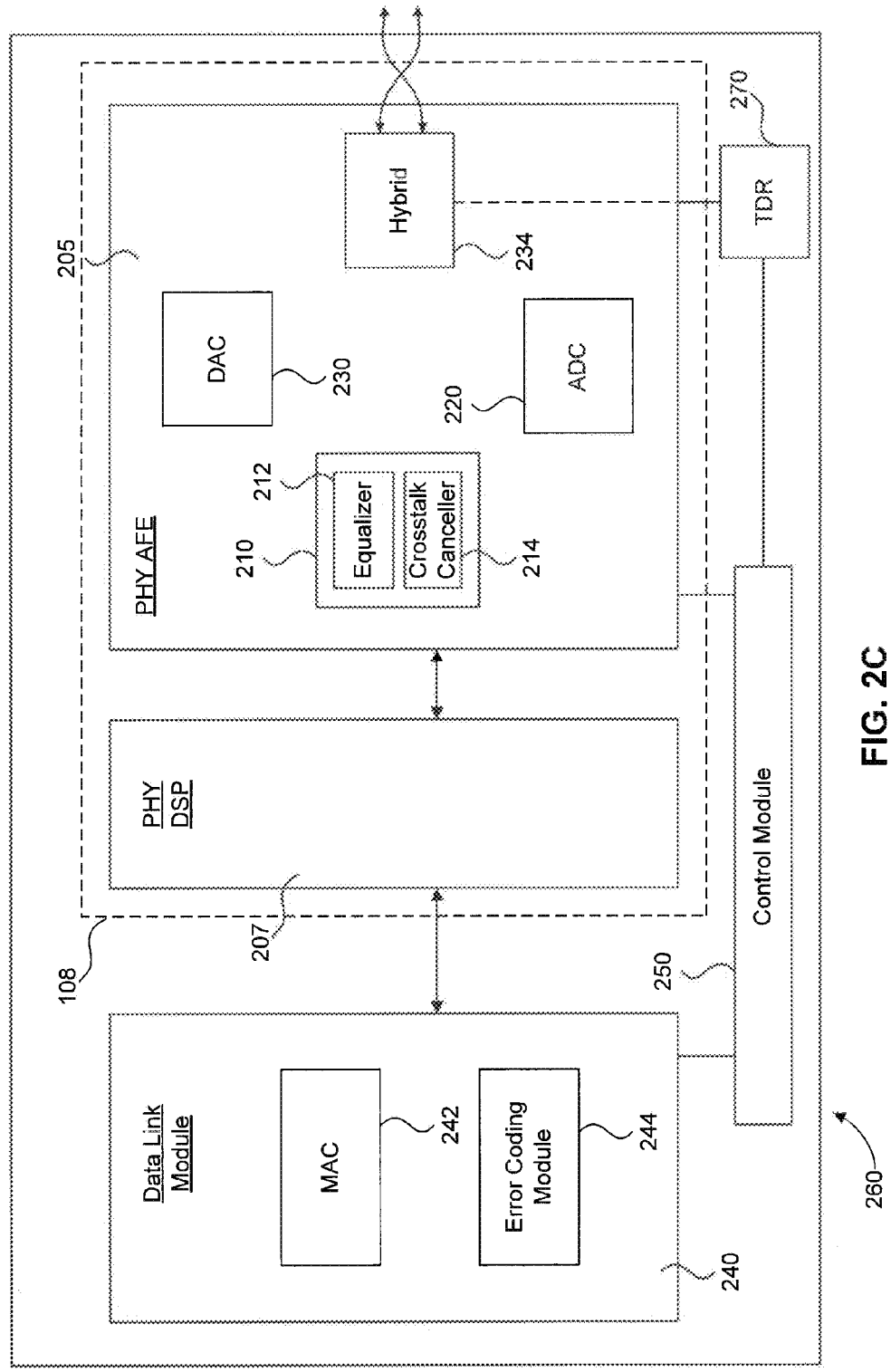

FIG. 2C illustrates a block diagram of transceiver 260 according to an embodiment of the present invention. Transceiver 260 is similar to transceiver 202 but further include a TDR module 270 coupled to each of the PHYs such as PHY 108. TDR module 270 is coupled to hybrid circuit 234. In this manner, TDR module 270 may perform TDR analysis on each cable link connected PHY 108. TDR module 270 is coupled to control module 250. In this way, control module 250 may control each of the power saving components based on the feedback of TDR module 270. In one embodiment, TDR module 270 may be integrated into PHY 108. In this way, each PHY of transceiver 260 has its own TDR module, assuming transceiver 260 has multiple PHYs.

Figure 2D:
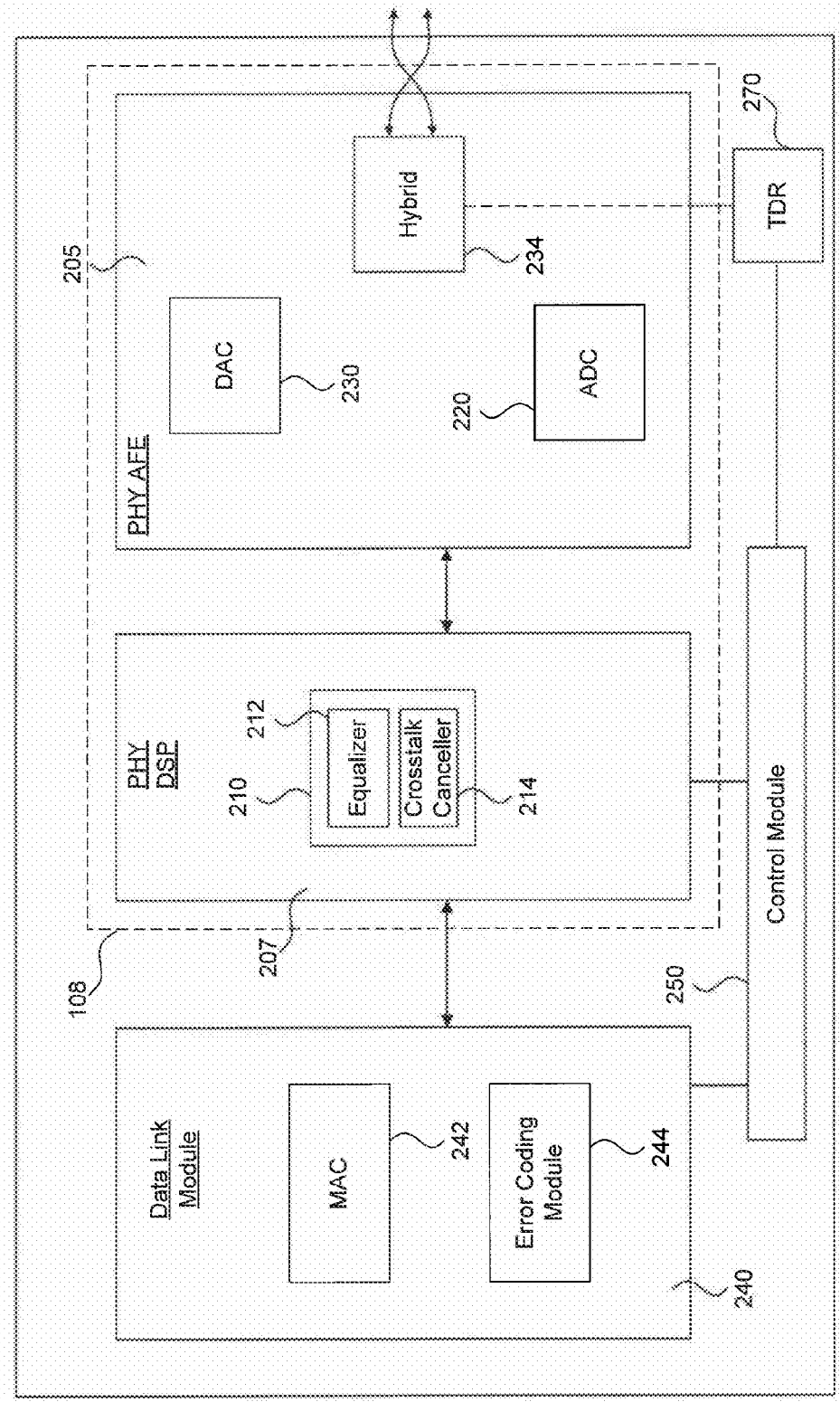

FIG. 2D illustrates a block diagram of transceiver 280 according to an embodiment of the present invention. Transceiver 280 is similar transceiver 260 but with signal processing module 210 being located in DSP module 207 rather than AFE 205. As previously mentioned, signal processing module 210 includes at least one equalizer 212 and at least one crosstalk canceller 214. The implementation of signal processing module 210 as being part of DSP module 207 or AFE 205 is apparent to one skilled in the relevant art.

As previously mentioned, powering down crosstalk cancellation filters or taps in the crosstalk cancellation filters are two of the ways to save power in a system where the cable length is less than 100 m. A typical transceiver has 24 crosstalk cancellation filters, one for each possible combination of couplings across a four wire pair cable.

Figure 3:
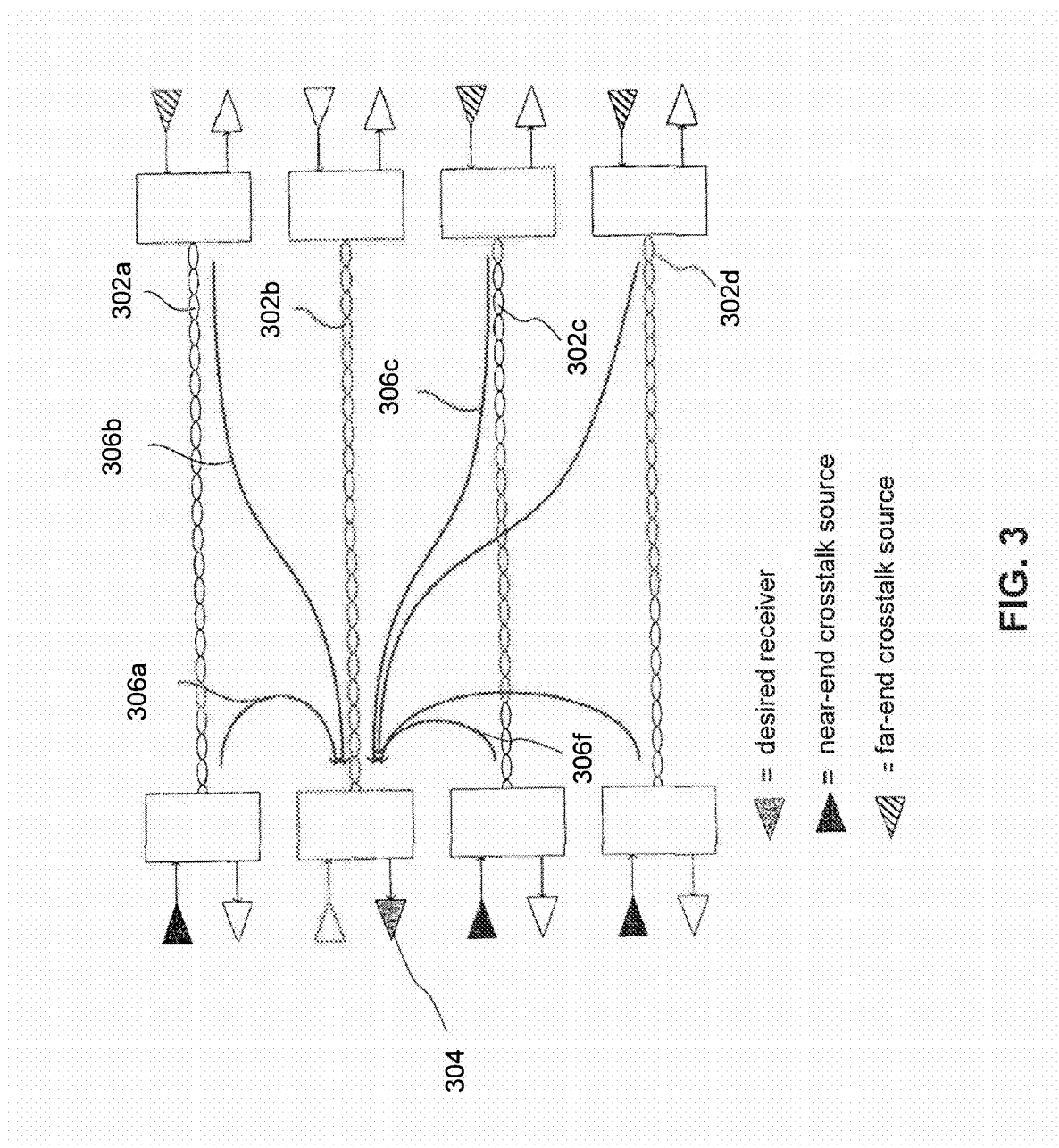
FIG. 3 illustrates crosstalk in a transceiver system utilizing four UTP cables.

FIG. 3 illustrates the crosstalk phenomenon in a four pair cable, including wire pairs 302*a-d*. As shown in FIG. 3, a receiver 304 located on one of the wire pair experiences crosstalk signal (noise) 306*a-f* from various crosstalk sources on other wire pairs. To effectively reduce crosstalk from all of these sources, a crosstalk cancellation filter is needed for each of the crosstalk couplings. For a four pair cable, a total of 12 near-end and 12 far-end cancellation filters are needed.

Figure 4:
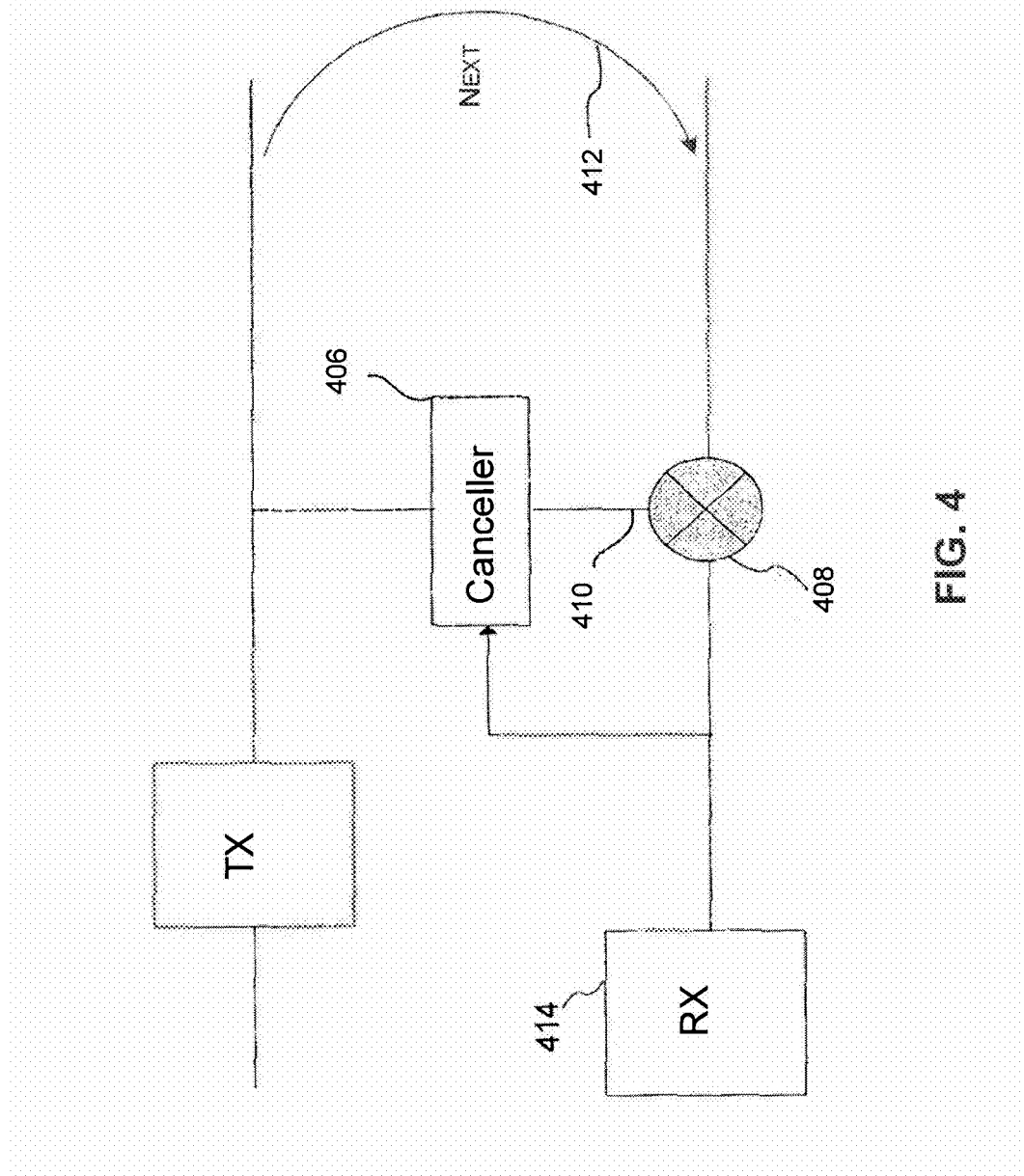
FIG. 4 illustrates a block diagram of an exemplary crosstalk cancellation filter.

FIG. 4 illustrates an exemplary crosstalk cancellation system 400. Crosstalk cancellation system 400 includes a crosstalk canceller 406 that is configured to receive a crosstalk interference signal 412 produced by a nearby transmitting wire pair. In general, canceller 406 has no way of knowing the characteristics of a NEXT interference signal 412. Thus, canceller 406 derives a correction signal 410 using an adaptive feedback algorithm to evaluate and adjust correction errors in successive cycles. Once correction signal 410 is produced, it is added to the NEXT interference signal 412 by an adder 408. In this way, a receiver 414 is free from NEXT interference signal 412.

Figure 5:
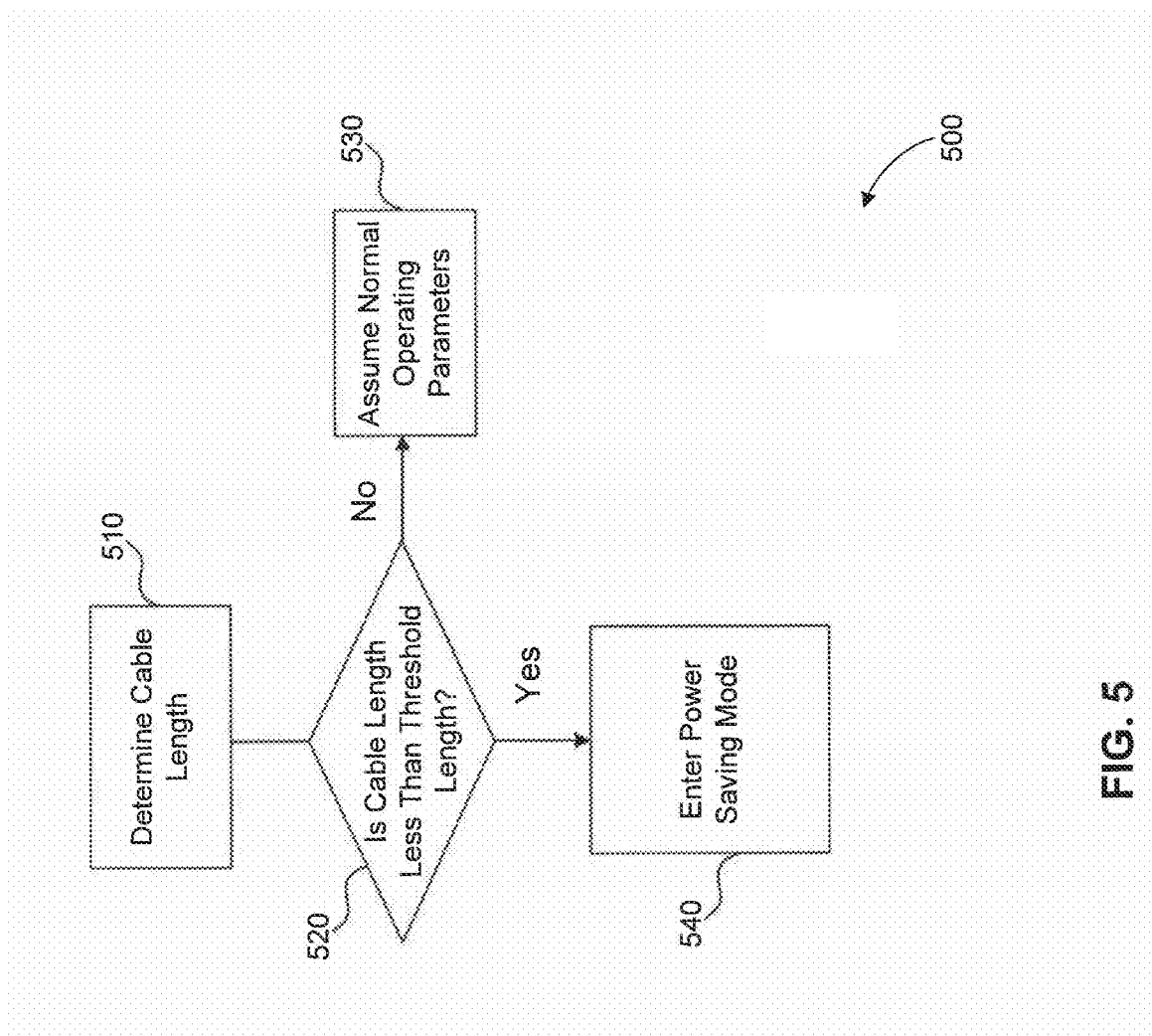
FIG. 5 illustrates an exemplary operational flow chart according to an embodiment of the present invention.

FIG. 5 illustrates an example flowchart 500 that further describes power management according to embodiment of the invention. In step 510, the length of a cable connecting the PHY to a link partner is determined. As previously mentioned, the cable length may be determined using various methods such as time-domain reflectometry. In step 520, a determination is made on whether the cable length is less than a threshold length. In an embodiment, the threshold length is 100 meters. If the answer is no, step 530 is executed. In step 530, PHY 108 is configured to operate with normal parameters for a communication system with a cable link of more than the threshold length, for example, more than 100 meters in length. For example, all of system 200 crosstalk cancellation filters would be fully operational if the cable length is greater than 100 m, and none of the taps in crosstalk cancellation filters and equalizer would be shut off.

Step 540 is executed if the cable length is less than the threshold length. In step 540, PHY 108 enters power saving mode. While in power saving mode, PHY 108 may take one or more of the following actions: powering down taps in echo and crosstalk cancellation filters; powering down crosstalk cancellation filters with small coefficients; powering down taps in an equalizer and/or a precoder; bypassing additional equalization blocks; reducing datapath wordlength; reducing resolution of an analog-to-digital converter (ADC); reducing resolution of a digital-to-analog converter (DAC); reducing linearity requirements on the ADC, DAC, and/or any amplifiers; reducing a power provided to one or more components of the PHY, or any portion thereof.

In power saving mode, control module 250 may reduce the resolution of the ADC 220 and/or DAC 230. For example, the resolution of ADC 220 may be reduced to 10 bits from 16 bits. This may be achieved by manipulating the reference input voltage of the ADC, for example. Control module 250 may also change the linearity requirement of ADC 220 and/or DAC 230. In a low noise environment, such as one experienced by a cable of less than 100 m, high linearity is not required. Accordingly, the linearity requirement of the ADC/DAC may be reduced to save power.

Further, control module 250 may completely turn off one or more of crosstalk canceller 214. Alternatively, control module 250 may turn off all of crosstalk canceller 214 or all of the NEXT and FEXT filters in communication system 200.

In an embodiment, control module 250 may turn off one or more taps of a crosstalk cancellation filter 214, and/or equalizer 212 while in power saving mode. Although any number of taps may be turned off, it is preferred that the number of taps being turned off would yield a balanced filter/equalizer. For example, if crosstalk cancellation filter 212 has seven taps, then two of the taps, one on each side of the center tap, would be turned off.

In an embodiment, control module 250 causes data link module 240 to reduce the data word length from, for example, 32 bits to 16 bits while in PHY 108 is in power saving mode. Control module 250 may also cause error coding module 244 to reduce the coding length of a forward error correction algorithm. In an embodiment, error coding module 244 may use a less complex error coding algorithm. For example, in power saving mode, error coding module 244 may switch from a soft decision based algorithm to a hard decision based algorithm. Further, a reduced iteration may also be employed for the selected error coding algorithm. Alternatively, error coding module 244 may disable the error coding function altogether.

Figure 6:
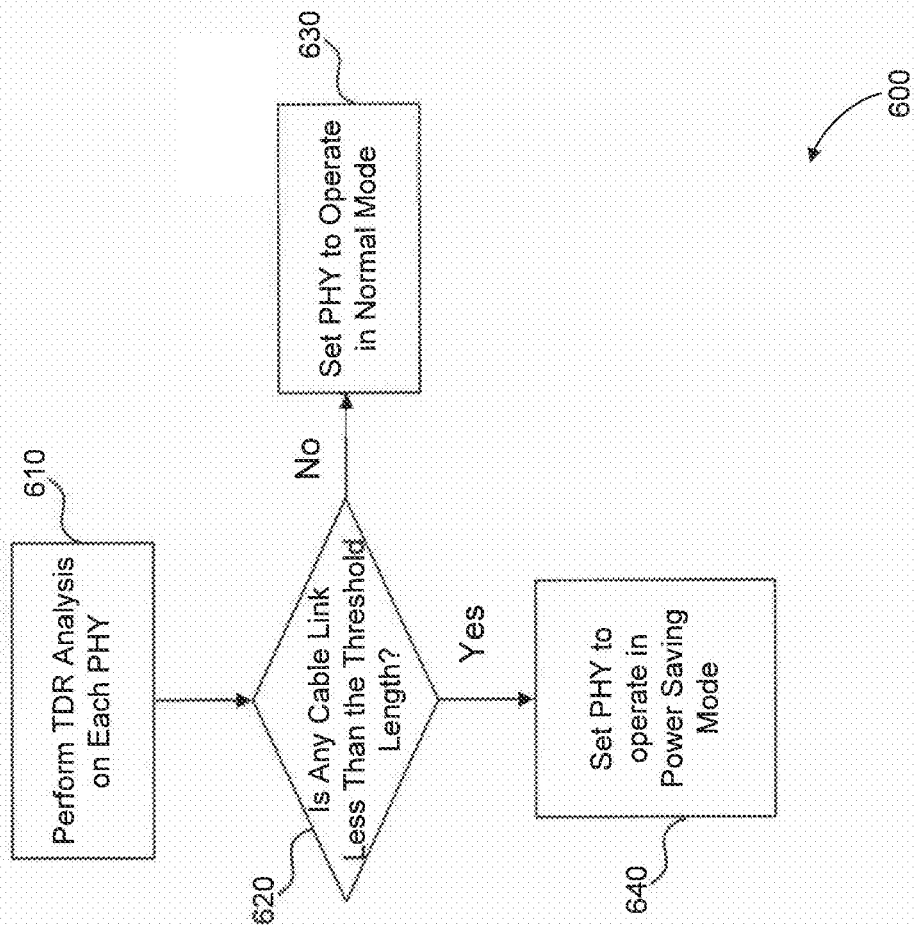
FIG. 6 illustrates an exemplary operational flow chart according to another embodiment of the present invention.

FIG. 6 illustrates an example flowchart 600 according to an embodiment of the invention. In step 610, TDR module 270 performs a TDR analysis on each of the cable links in each of the PHYs. In step 620, TDR module 270 determines if there is any link having a cable length below the cable length threshold based on the results of the TDR analysis. In an embodiment, the cable length threshold is 100 meters. If the answer is no, step 630 is executed. In step 630, transceiver 260 sets all of the PHYs to operate in accordance with normal parameters. For example, in normal operating parameters, all PHYs would be operating in full power (e.g. all of the power saving components are operating in normal mode as opposed to power saving modes).

Step 640 is executed if any cable link has a cable length less than the threshold length (e.g. less than 100 meters). For ease of illustration, this cable link will be referred to as a candidate link. In step 640, transceiver 260 configures one or more components connected to the candidate link to power saving mode. In doing so, more power is allocated to the PHYs having longer cable lengths, than those having shorter cable lengths. While it power saving mode, one or more of the following steps may be taken by the PHY having the candidate link: powering down taps in echo and crosstalk cancellation filters; powering down crosstalk cancellation filters with small coefficients; powering down taps in an equalizer and/or a precoder; bypassing additional equalization blocks; reducing datapath wordlength; reducing resolution of an analog-to-digital converter (ADC); reducing resolution of a digital-to-analog converter (DAC); reducing linearity requirements on the ADC, DAC, and/or any amplifiers; reducing a power provided to one or more components of the PHY, or any portion thereof.

It will be apparent to persons skilled in the relevant art(s) from the teachings herein that the present invention is not limited to the examples provided in the forgoing description. That is, the spirit and scope of the present invention supports modifications and adjustment of the examples provided herein so that the present invention is applicable to, for example, point-to-multipoint or multipoint-to-multipoint communication links, wireless, optical or infrared transceivers and standards governing the operation thereof. Additionally, the power management of a PHY or a transceiver comprising multiple PHYs can be implemented in a line card or an IC chip in accordance with an embodiment of the present invention.

Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An apparatus comprising:
   a physical layer device (PHY), configured to:
   determine a length of a cable communicatively coupling the PHY to a link partner; and
   switch one or more components of the PHY to a power saving mode based on the length of the cable by modifying a parameter of at least one of the one or more components, thereby reducing an amount of power consumed by the PHY.

2. The apparatus of claim 1, wherein the PHY is further configured to determine the length of the cable using time-domain reflectometry (TDR) techniques.

3. The apparatus of claim 1, wherein the one or more components include at least one of:
   an echo cancellation filter;
   a crosstalk filter;
   an equalizer;
   a precoder;
   a forward error correction (FEC) decoder; and
   a FEC coder.

4. The apparatus of claim 1, wherein the PHY is further configured to implement at least one protocol governed by IEEE 802.3.

5. The apparatus of claim 1, wherein the PHY is further configured to switch the one or more components to the power saving mode when the length of the cable is less than a threshold length.

6. The apparatus of claim 5, wherein the threshold length is a predetermined fixed distance.

7. The apparatus of claim 1, wherein the PHY is further configured to turn off the one or more components based on the length of the cable.

8. The apparatus of claim 1, wherein the one or more components comprises an echo cancellation filter, and wherein the PHY is further configured to turn off one or more taps of the echo cancellation filter based on the length of the cable.

9. The apparatus of claim 1, wherein the one or more components comprises a crosstalk filter, and wherein the PHY is further configured to turn off one or more taps of the crosstalk filter based on the length of the cable.

10. The apparatus of claim 1, wherein the one or more components comprises an equalizer, and wherein the PHY is further configured to turn off one or more taps of the equalizer based on the length of the cable.

11. The apparatus of claim 1, wherein the one or more components comprises at least one of an analog-to-digital converter (ADC) and a digital-to-analog converter (DAC), and wherein the PHY is further configured to reduce at least one of a resolution and linearity requirement of at least one of the ADC and the DAC based on the length of the cable.

12. The apparatus of claim 1, wherein the one or more components comprises a FEC coder, and wherein the PHY is further configured to reduce a coding length of the FEC coder based on the length of the cable.

13. The apparatus of claim 1, wherein the one or more components comprises an iterative FEC decoder, and wherein the PHY is further configured to reduce a number of iterations in the iterative FEC decoder based on the length of the cable.

14. The apparatus of claim 1, wherein the one or more components comprises a FEC decoder, and wherein the PHY is further configured to reconfigure the FEC decoder from a soft decision FEC decoder to a hard decision FEC decoder based on the length of the cable.

15. An apparatus comprising:
   a transceiver, comprising a plurality of physical layer devices (PHYs), comprising one or more components,
   wherein at least one of the plurality of PHYs is configured to determine a length of a cable communicatively coupling the at least one of the plurality of PHYs to at least one link partner,
   wherein the transceiver is configured to determine a first cumulative cable length for a first set of the plurality of PHYs,
   wherein the transceiver is configured to determine a second cumulative cable length for a second set of the plurality of PHYs,
   wherein the transceiver is configured to allocate a first quantity of power to the first set of the plurality of PHYs when the first cumulative cable length is above a threshold length, and
   wherein the transceiver is configured to allocate a second quantity of power to the second set of the plurality of PHYs when the second cumulative cable length is below the threshold length.

16. The apparatus of claim 15, wherein the first quantity of power is greater than the second quantity of power.

17. The apparatus of claim 16, wherein at least one of the first set and second set is configured to switch the one or components to a power saving mode based on at least one of the first quantity, the second quantity, and the length of the cable.

18. The apparatus of claim 15, wherein the one or more components comprise at least one of:
   an echo cancellation filter;
   a crosstalk filter;
   an equalizer;
   a precoder;
   an analog-to-digital converter (ADC); and
   a digital-to-analog converter (DAC).

19. The apparatus of claim 15, wherein the threshold length is a predetermined fixed distance.

20. The apparatus of claim 15, wherein the first set of PHYs and second set of PHYs operate independently from one another.

* * * * *